United States Patent
Nishigaki et al.

(10) Patent No.: US 10,400,694 B2
(45) Date of Patent: Sep. 3, 2019

(54) HYBRID VEHICLE

(71) Applicant: TOYOTA JIDOSHA KABUSHIKI KAISHA, Toyota-shi, Aichi-ken (JP)

(72) Inventors: Takahiro Nishigaki, Nagoya (JP); Takashi Suzuki, Miyoshi (JP); Tomoya Suzuki, Nagakute (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 122 days.

(21) Appl. No.: 15/798,614

(22) Filed: Oct. 31, 2017

(65) Prior Publication Data

US 2018/0149103 A1 May 31, 2018

(30) Foreign Application Priority Data

Nov. 25, 2016 (JP) ................. 2016-228859

(51) Int. Cl.
| | |
|---|---|
| *F02D 41/02* | (2006.01) |
| *F02D 29/02* | (2006.01) |
| *B60W 10/06* | (2006.01) |
| *B60W 10/08* | (2006.01) |
| *B60W 10/115* | (2012.01) |

(Continued)

(52) U.S. Cl.
CPC ........... *F02D 41/029* (2013.01); *B60W 10/06* (2013.01); *B60W 10/08* (2013.01); *B60W 10/115* (2013.01); *B60W 20/00* (2013.01); *F01N 3/023* (2013.01); *F01N 9/002* (2013.01); *F02D 17/04* (2013.01); *F02D 29/02* (2013.01); *B60W 2530/12* (2013.01); *F01N 2590/11* (2013.01); *F01N 2900/08* (2013.01); *F01N 2900/1602* (2013.01); *F01N 2900/1606* (2013.01); *F02D 2200/0812* (2013.01); *Y02T 10/47* (2013.01)

(58) Field of Classification Search
CPC ........ F02D 17/04; F02D 29/02; F02D 41/029; F02D 2200/0812; F01N 3/023; F01N 9/002; F01N 2590/11; F01N 2900/08; F01N 2900/1602; F01N 2900/1606; B60W 10/06; B60W 10/08; B60W 10/115; B60W 20/00; B60W 2530/12; Y02T 10/47
See application file for complete search history.

(56) References Cited

FOREIGN PATENT DOCUMENTS

| JP | 2002242721 A | * | 8/2002 |
| JP | 2015128935 A | * | 7/2015 |

(Continued)

*Primary Examiner* — Audrey K Bradley
(74) *Attorney, Agent, or Firm* — Finnegan, Henderson, Farabow, Garrett & Dunner, LLP

(57) ABSTRACT

A hybrid vehicle includes: an engine for traveling in which a filter that removes particulate matter is attached to an exhaust system; a motor configured to generate a driving force for the hybrid vehicle; and an electronic control unit configured to restart injection of a fuel into the engine when a needed output of the engine reaches a threshold or higher while the injection of the fuel into the engine is stopped. The electronic control unit is configured to, when a filter regeneration condition that an accumulation amount of the particulate matter on the filter is equal to or more than a predetermined accumulation amount and a temperature of the filter is equal to or higher than a predetermined temperature is established, set the threshold to be higher than a threshold set when the filter regeneration condition is not established.

2 Claims, 4 Drawing Sheets

(51) Int. Cl.
    *B60W 20/00*     (2016.01)
    *F01N 3/023*     (2006.01)
    *F01N 9/00*     (2006.01)
    *F02D 17/04*     (2006.01)

(56) References Cited

FOREIGN PATENT DOCUMENTS

| | | |
|---|---|---|
| JP | 2015-202832 | 11/2015 |
| WO | WO 2015/159218 A2 | 10/2015 |

* cited by examiner

HYBRID VEHICLE

INCORPORATION BY REFERENCE

The disclosure of Japanese Patent Application No. 2016-228859 filed on Nov. 25, 2016 including the specification, drawings and abstract is incorporated herein by reference in its entirety.

BACKGROUND

1. Technical Field

The disclosure relates to a hybrid vehicle, and particularly to a hybrid vehicle including an engine having an exhaust system to which a filter is provided, and a motor.

2. Description of Related Art

In the related art, a hybrid vehicle in which an engine having an exhaust passage in which a filter for removing particulate matter is provided, a first motor generator, a driving shaft connected to driving wheels, and a second motor generator are connected to three shafts of a power split device (planetary gear mechanism) and electric power is exchanged between the first and second motor generators and a battery is proposed (example, refer to Japanese Unexamined Patent Application Publication No. 2015-202832 (JP 2015-202832 A)). When regeneration of the filter is needed, the hybrid vehicle expands a control range of the state of change (SOC) of the battery, decreases the SOC of the battery below the lower limit of the control range before the expansion, thereafter increases the SOC above the upper limit of the control range before the expansion, and then stops the injection of a fuel into the engine. When the temperature of the filter is within a regenerable temperature range suitable for regeneration and the injection of the fuel into the engine is stopped, air containing oxygen is supplied to the filter to burn the particulate matter. In this manner, regeneration of the filter is performed. As described above, when regeneration of the filter is needed, the control range of the SOC is expanded to reduce the SOC. Therefore, compared to a case where the SOC is not reduced, the subsequent operation time of the engine is prolonged to ensure the operation time of the engine needed to increase the temperature of the filter to the regenerable temperature range and rapidly regenerate the filter.

SUMMARY

In the hybrid vehicle described above, when regeneration of the filter is performed by supplying the air containing oxygen to the filter as the injection of the fuel is stopped, there may be cases where the injection of the fuel into the engine (operation) is restarted within a relatively short time and regeneration of the filter is not be sufficiently performed.

The disclosure provides a hybrid vehicle which enables regeneration of a filter to be more sufficiently performed.

An aspect relates to a hybrid vehicle including: an engine having an exhaust system in which a filter that removes particulate matter is provided; a first motor configured to generate a driving force for the hybrid vehicle; and an electronic control unit configured to restart injection of a fuel into the engine when a needed output of the engine reaches a threshold or higher while the injection of the fuel into the engine is stopped. The electronic control unit is configured to, when a filter regeneration condition that an accumulation amount of the particulate matter on the filter is equal to or more than a predetermined accumulation amount and a temperature of the filter is equal to or higher than a predetermined temperature is established, set the threshold to be higher than a threshold set when the filter regeneration condition is not established.

According to the aspect, regarding the restarting of the injection of the fuel into the engine when the needed output of the engine reaches the threshold or higher while the injection of the fuel into the engine is stopped, when the filter regeneration condition that the accumulation amount of the particulate matter on the filter is equal to or more than the predetermined accumulation amount and the temperature of the filter is equal to or higher than the predetermined temperature is established, the threshold is set to be higher than that of when the filter regeneration condition is not established. When the filter regeneration condition is established, regeneration of the filter is performed by supplying air (oxygen) to the filter by stopping the injection of the fuel into the engine and burning the particulate matter deposited on the filter. In the hybrid vehicle according to the aspect, when the filter regeneration condition is established, the threshold is set to be higher than that of when the filter regeneration condition is not established. Accordingly, while the filter regeneration condition is established and the injection of the fuel into the engine is stopped, an increase in the needed output to the threshold or higher can be suppressed, and restarting of the injection of the fuel into the engine can be suppressed. As a result, regeneration of the filter can be performed more sufficiently.

In the aspect, the hybrid vehicle may further include: a second motor; and a planetary gear having three rotating elements, each of which is connected to a driving shaft connected to a driving wheel, an output shaft of the engine, and a rotating shaft of the second motor, respectively. The motor for traveling may be connected to the driving shaft. The electronic control unit may be configured to, while the filter regeneration condition is established and the injection of the fuel into the engine is stopped, control the second motor such that the engine is motored by the second motor. According to the aspect, a larger amount of air (oxygen) can be supplied to the filter, and the time needed to complete the regeneration of the filter can be shortened.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiments will be described with reference to examples.

Figure 1:
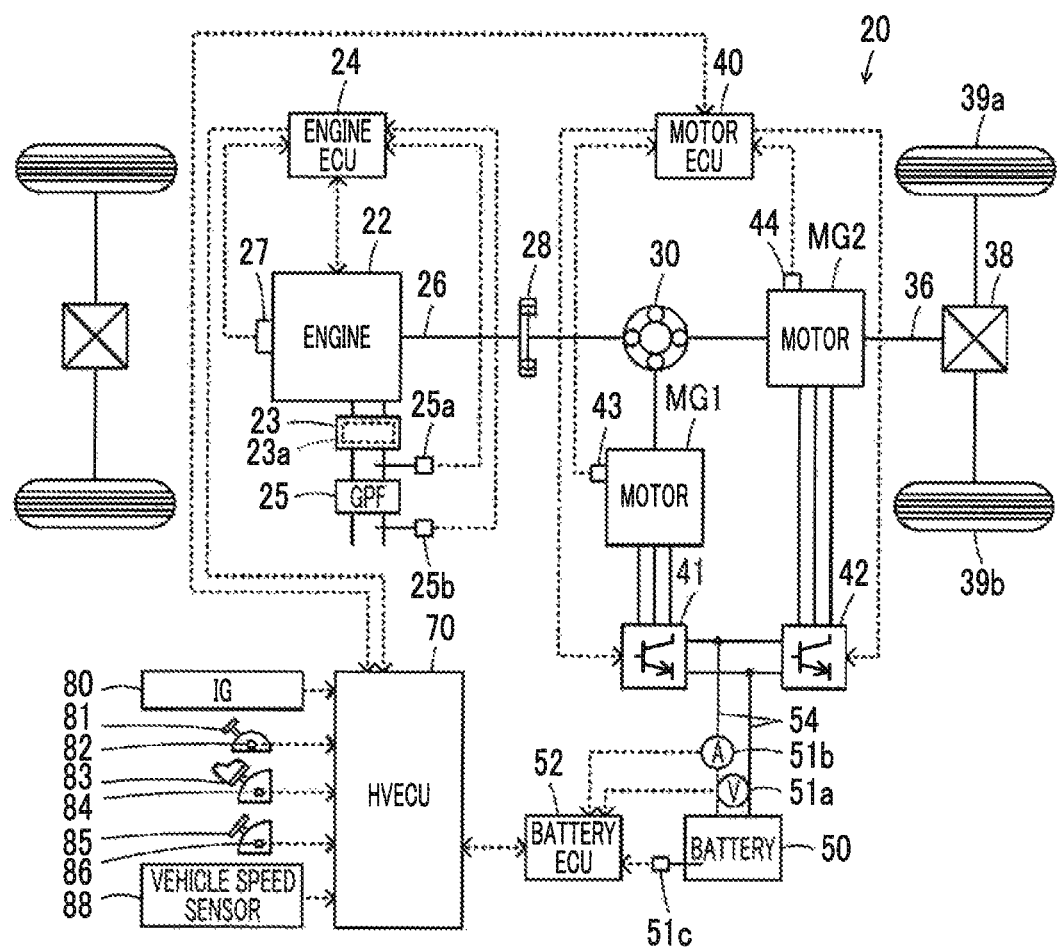
FIG. 1 is a configuration diagram schematically illustrating the configuration of a hybrid vehicle as an example.

FIG. 1 is a configuration diagram schematically illustrating the configuration of a hybrid vehicle 20 as an example. As illustrated in the figure, the hybrid vehicle 20 of the example includes an engine 22, a planetary gear 30, motors MG1, MG2, inverters 41, 42, a battery 50 as a power storage device, and a hybrid electronic control unit (hereinafter, referred to as "HVECU") 70.

The engine 22 is configured as an internal combustion engine that outputs power using gasoline, diesel fuel, or the like as a fuel. An exhaust gas control apparatus 23 and a particulate matter removing filter (hereinafter, referred to as "PM filter") 25 are attached to the exhaust system of the engine 22. The exhaust gas control apparatus 23 is filled with a catalyst 23a that removes unburned fuel and nitrogen oxides in the exhaust gas. The PM filter 25 is formed as a porous filter made of ceramic, stainless steel, or the like and removes particulate matter (PM) such as soot in the exhaust gas. The operation of the engine 22 is controlled by an engine electronic control unit (hereinafter, referred to as "engine ECU") 24.

Although not illustrated in the figure, the engine ECU 24 is configured as a microprocessor mainly including a CPU, and includes, in addition to the CPU, a ROM that stores processing programs, a RAM that temporarily stores data, input/output ports, and communication ports. Signals from various sensors needed for controlling the operation of the engine 22 are input to the engine ECU 24 via the input ports. Examples of the signals input to the engine ECU 24 include a crank angle θcr from a crank position sensor 27 that detects the rotational position of a crankshaft 26 and a coolant temperature Tw from a coolant temperature sensor (not illustrated) that measures the temperature of the coolant of the engine 22. In addition, examples thereof also include a throttle valve opening degree TH from a throttle valve position sensor (not illustrated) that detects the position of a throttle valve, an intake air amount Qa from an air flow meter (not illustrated) attached to an intake pipe, and an intake air temperature Ta from a temperature sensor (not illustrated) attached to the intake pipe. Furthermore, examples thereof also include pressures P1, P2 from pressure sensors 25a, 25b attached to the upstream side and the downstream side of the PM filter 25 of the exhaust system. Various control signals for controlling the operation of the engine 22 are output from the engine ECU 24 via the output ports. Examples of signals output from the engine ECU 24 include a drive control signal for a throttle motor that adjusts the position of the throttle valve, a drive control signal for a fuel injection valve, and a drive control signal for an ignition coil integrated with an igniter. The engine ECU 24 is connected to the HVECU 70 via the communication port. The engine ECU 24 calculates a rotational speed Ne of the engine 22 based on the crank angle θcr from the crank position sensor 27. In addition, the engine ECU 24 also calculates, based on the intake air amount Qa from the air flow meter and the rotational speed Ne of the engine 22, a volumetric efficiency (the ratio of the volume of the air actually drawn in one cycle to the stroke volume per cycle of the engine 22) KL. Furthermore, the engine ECU 24 calculates (estimates) a PM accumulation amount Qpm as the accumulation amount of the particulate matter accumulated on the PM filter 25 based on the pressure difference ΔP (ΔP=P1−P2) between the pressures P1, P2 from the pressure sensors 25a, 25b, or calculates (estimates) filter temperature Tf as the temperature of the PM filter 25 based on the operation state (the rotational speed Ne and volumetric efficiency KL) of the engine 22.

The planetary gear 30 is configured as a single-pinion planetary gear mechanism. The rotor of the second motor MG 1 is connected to the sun gear of the planetary gear 30. A driving shaft 36 connected to driving wheels 39a, 39b via a differential gear 38 is connected to the ring gear of the planetary gear 30. The crankshaft 26 of the engine 22 is connected to the carrier of the planetary gear 30 via a damper 28.

For example, the second motor MG 1 is configured as a synchronous generator motor, and as described above, the rotor thereof is connected to the sun gear of the planetary gear 30. For example, the motor MG2 for traveling is configured as a synchronous generator motor, and the rotor thereof is connected to the driving shaft 36. The inverters 41, 42 are connected to the motors MG1, MG2 and are also connected to the battery 50 via electric power lines 54. The motors MG1, MG2 are rotatably driven by switching control of a plurality of switching elements (not illustrated) of the inverters 41, 42 by a motor electronic control unit (hereinafter, referred to as "motor ECU") 40.

Although not illustrated in the figure, the motor ECU 40 is configured as a microprocessor mainly including a CPU, and includes, in addition to the CPU, a ROM that stores processing programs, a RAM that temporarily stores data, input/output ports, and communication ports. Signals from various sensors needed for controlling the driving of the motors MG1, MG2, for example, rotational positions θm1, θm2 from rotational position detection sensors 43, 44 that detect the rotational positions of the rotors of the motors MG1, MG2, and phase currents from a current sensor 51b that measures the current flowing through each phase of the motors MG1, MG2, are input to the motor ECU 40 via the input ports. Switching control signals for the switching elements (not illustrated) of the inverters 41, 42 and the like are output from the motor ECU 40 via the output ports. The motor ECU 40 is connected to the HVECU 70 via the communication port. The motor ECU 40 calculates, based on the rotational positions θm1, θm2 of the rotors of the motors MG1, MG2 from rotational position detection sensors 43, 44, rotational speeds Nm1, Nm2 of the motors MG1, MG2.

For example, the battery 50 is configured as a lithium-ion secondary battery or a nickel-hydrogen secondary battery, and is connected to the inverters 41, 42 via the electric power lines 54. The battery 50 is managed by a battery electronic control unit (hereinafter referred to as "battery ECU") 52.

Although not illustrated in the figure, the battery ECU 52 is configured as a microprocessor mainly including a CPU, and includes, in addition to the CPU, a ROM that stores processing programs, a RAM that temporarily stores data, input/output ports, and communication ports. Signals from various sensors needed for managing the battery 50 are input to the battery ECU 52 via the input ports. Examples of signals to be input to the battery ECU 52 include a voltage Vb of the battery 50 from a voltage sensor 51a installed between the terminals of the battery 50, a current 1b of the battery 50 from the current sensor 51b attached to the output terminal of the battery 50, and a temperature Tb of the battery 50 from a temperature sensor 51c attached to the battery 50. The battery ECU 52 is connected to the HVECU 70 via the communication port. The battery ECU 52 calculates a stored power ratio SOC based on the integrated value of the current Ib of the battery 50 from the current sensor 51b or calculates input/output limits Win, Wout based on the calculated stored power ratio SOC and the temperature Tb of the battery 50 from the temperature sensor 51c. The stored power ratio SOC is the ratio of the capacity of the electric power from which the battery 50 can be discharged to the total capacity of the battery 50. The input and output limits Win, Wout are allowable charge/discharge electric powers at which the battery 50 may be charged or discharged.

Although not illustrated in the figure, the HVECU 70 is configured as a microprocessor mainly including a CPU, and includes, in addition to the CPU, a ROM that stores processing programs, a RAM that temporarily stores data, input/output ports, and communication ports. Signals from various sensors are input to the HVECU 70 via the input ports. Examples of signals to be input to the HVECU 70 include an ignition signal from an ignition switch 80 and a shift position SP from a shift position sensor 82 that detects the operation position of a shift lever 81. In addition, examples thereof may further include an accelerator operation amount Acc from an accelerator pedal position sensor 84 that detects the depression amount of an accelerator pedal 83, a brake pedal position BP from a brake pedal position sensor 86 that detects the depression amount of a brake pedal 85, and a vehicle speed V from a vehicle speed sensor 88. As described above, the HVECU 70 is connected to the engine ECU 24, the motor ECU 40, and the battery ECU 52 via the communication ports.

The hybrid vehicle 20 of the example configured as described above travels in a hybrid traveling mode (HV traveling mode) in which the hybrid vehicle 20 travels in accordance with the rotation (operation or stopping the injection of the fuel during rotation) of the engine 22 or in an electric traveling mode (EV traveling mode) in which the hybrid vehicle 20 travels in accordance with the rotation stop (operation stop) of the engine 22.

In the HV traveling mode, basically, the following HV normal traveling control is performed by cooperative control among the HVECU 70, the engine ECU 24, and the motor ECU 40. The HVECU 70 sets the needed torque Td* which is needed for traveling (needed for the driving shaft 36) based on the accelerator operation amount Acc and the vehicle speed V, and calculates a needed power Pd* needed for traveling (needed for the driving shaft 36) by multiplying the set needed torque Td* by a rotational speed Nd of the driving shaft 36. Here, as the rotational speed Nd of the driving shaft 36, a rotational speed Nm2 of the motor MG2 for traveling, a rotational speed obtained by multiplying the vehicle speed V by a conversion factor, or the like can be used. Subsequently, a needed power Pe* needed for the vehicle (needed for the engine 22) is calculated by subtracting a charge/discharge needed power Pb* (a value which is positive during discharging from the battery 50) based on the stored power ratio SOC of the battery 50 from the needed power Pd*. In addition, a target rotational speed Ne* and a target torque Te* of the engine 22 and torque commands Tm1*, Tm2* of the motors MG1, MG2 are set so that the needed power Pe* is output from the engine 22 and the needed torque Td* is output to the driving shaft 36 in the ranges of the input/output limits Win, Wout of the battery 50. Furthermore, the target rotational speed Ne* and the target torque Te* of the engine 22 are transmitted to the engine ECU 24, and the torque commands Tm1*, Tm2* of the motors MG1, MG2 are transmitted to the motor ECU 40. When the engine ECU 24 receives the target rotational speed Ne* and the target torque Te* of the engine 22, the engine ECU 24 performs intake air amount control, fuel injection control, ignition control, and the like for the engine 22 so as to operate the engine 22 based on the target rotational speed Ne* and the target torque Te*. When the motor ECU 40 receives the torque commands Tm1*, Tm2* of the motors MG1, MG2, the motor ECU 40 performs drive control of the motors MG1, MG2 so as to drive the motors MG1, MG2 under the torque commands Tm1* and Tm2* (performs the switching control of the switching elements of the inverters 41, 42).

In the EV traveling mode, basically, the following EV normal traveling control is performed by cooperative control among the HVECU 70, the engine ECU 24, and the motor ECU 40. The HVECU 70 sets the needed torque Td* based on the accelerator operation amount Acc and the vehicle speed V, sets the torque command Tm1* of the second motor MG1 to a value of zero, sets the torque command Tm2* of the motor MG2 for traveling so as to output the needed torque Td* to the driving shaft 36 in the ranges of the input/output limits Win, Wout of the battery 50, and transmits the torque commands Tm1*, Tm2* of the motors MG1, MG2 to the motor ECU 40. Drive control of the motors MG1, MG2 by the motor ECU 40 is described above.

In the hybrid vehicle 20 of the example, in the HV traveling mode, when a filter regeneration condition for regenerating the PM filter 25 is established, when the injection of the fuel into the engine 22 is stopped, air (oxygen) is supplied to the PM filter 25, and the particulate matter accumulated on the PM filter 25 is burned, thereby regenerating the PM filter 25. Here, as the filter regeneration condition, a condition that the PM accumulation amount Qpm as the accumulation amount of the particulate matter accumulated on the PM filter 25 is equal to or more than a predetermined accumulation amount Qpmref and the filter temperature Tf as the temperature of the PM filter 25 is equal to or more than a predetermined temperature Tfref is used. The predetermined accumulation amount Qpmref is the lower limit of the PM accumulation amount range by which it can be determined that regeneration of the PM filter 25 is needed, and for example, may be 3 g/L, 4 g/L, or 5 g/L. The predetermined temperature Tfref is the lower limit of the regenerable temperature range suitable for regeneration of the PM filter 25, and for example, may be 580° C., 600° C., or 620° C. Therefore, the filter regeneration condition can be regarded as a condition that regeneration of the PM filter 25 is needed and the filter temperature Tf is within the regenerable temperature range.

Figure 2:
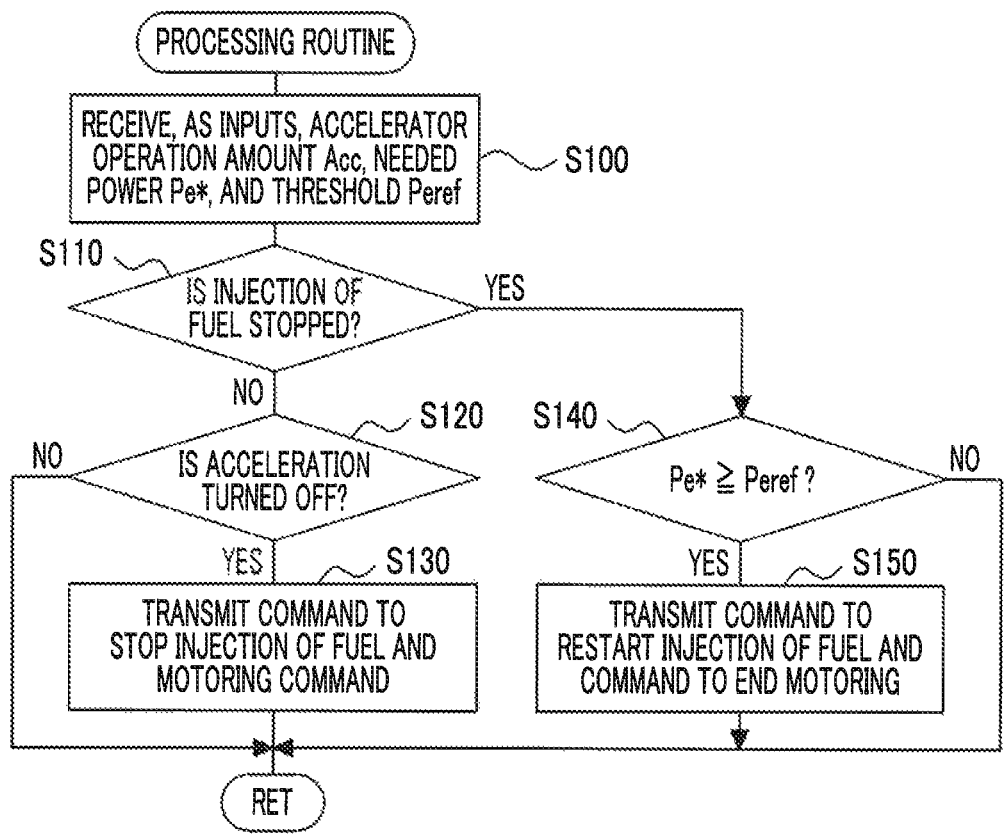
FIG. 2 is a flowchart showing an example of a processing routine executed by an HVECU of the example.

Next, the operation of the hybrid vehicle 20 of the example configured as described above, and the operation of the engine 22 during the HV traveling mode will be described. FIG. 2 is a flowchart showing an example of a processing routine executed by the HVECU 70 of the example. The routine is repeatedly executed during the HV traveling mode.

When the processing routine in FIG. 2 is executed, the HVECU 70 receives, as inputs, data such as the accelerator operation amount Acc, the needed power Pe*, and a threshold Peref (step S100). Here, as the accelerator operation amount Acc, a value measured by the accelerator pedal position sensor 84 is input. As the needed power Pe*, a value set as described above is input. As the threshold Peref, a value set by a threshold setting routine, which will be described later, is input.

When the data is input in this manner, the HVECU 70 determines whether the engine 22 is in operation (the injection of the fuel is performed) or the injection of the fuel is stopped (step S110). When the HVECU 70 determines that the engine 22 is in operation (the injection of the fuel is performed), the HVECU 70 determines whether or not acceleration is turned off based on the accelerator operation amount Acc (step S120). When the HVECU 70 determines that acceleration is not turned off, the HVECU 70 determines that the engine 22 continues operating (the injection of the fuel), and the routine is ended. In this case, the HV normal traveling control is performed.

When the HVECU 70 determines in step S120 that acceleration is turned off, a command to stop the injection of the fuel into the engine 22 is transmitted to the engine ECU 24, a motoring command is transmitted to the motor ECU 40 (step S130), and the routine is ended. When the engine ECU 24 receives the command to stop the injection of the fuel into the engine 22, the injection of the fuel into the engine 22 is stopped. When the motor ECU 40 receives the motoring command, the motor ECU 40 controls the driving of the second motor MG1 such that the engine 22 is motored by the second motor MG1. The HV normal traveling control is stopped in this manner. In addition, while the filter regeneration condition is established and the injection of the fuel into the engine 22 is stopped, air (oxygen) is supplied to the PM filter 25, and the particulate matter accumulated on the PM filter 25 is burned, thereby regenerating the PM filter 25. Furthermore, by motoring the engine 22 by the second motor MG1, a larger amount of air (oxygen) can be supplied to the PM filter 25 while the filter regeneration condition is established and the injection of the fuel into the engine 22 is stopped. In addition, the time needed to complete the regeneration of the PM filter 25 can be shortened. In this case, the HVECU 70 sets the torque command Tm1* of the second motor MG1 so as to cause the engine 22 to be motored by the second motor MG1, sets the torque command Tm2* of the motor MG2 for traveling so as to cause the needed torque Td* to be output to the driving shaft 36 in the ranges of the input/output limits Win, Wout of the battery 50, and transmit the set torque commands Tm1*, Tm2* to the motor ECU 40. The motor ECU 40 controls the driving of the motors MG1, MG2 so as to drive the motors MG1, MG2 under the torque commands Tm1* and Tm2*.

When the HVECU 70 determines in step S110 that the injection of the fuel into the engine 22 is stopped, the needed power Pe* is compared to the threshold Peref (step S140). When the needed power Pe* is less than the threshold Peref, the HVECU 70 determines that the injection of the fuel into the engine 22 is stopped and motoring of the engine 22 by the second motor MG1 is continued, and the routine is ended.

When the needed power Pe* is equal to or more than the threshold Peref in step S140, a command to restart the injection of the fuel into the engine 22 is transmitted to the engine ECU 24, a command to end the motoring is transmitted to the motor ECU 40 (step S150), and the routine is ended. When the engine ECU 24 receives the command to restart the injection of the fuel into the engine 22, the injection of the fuel into the engine 22 (operation) is restarted. When the motor ECU 40 receives the command to end motoring, outputting a motoring torque from the second motor MG1 is ended. The HV normal traveling control is restarted in this manner.

Figure 3:
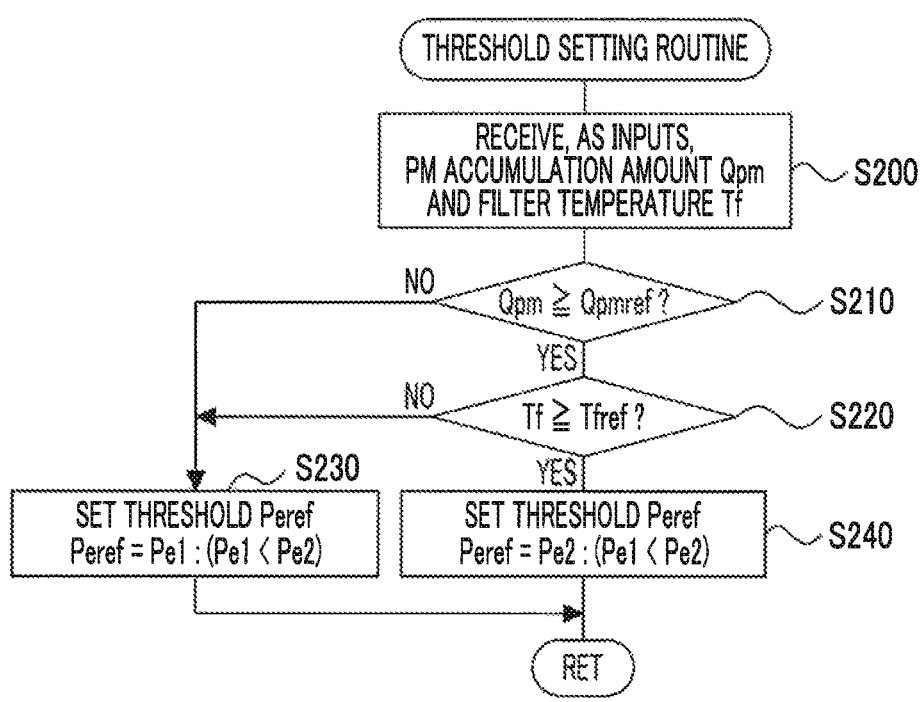
FIG. 3 is a flowchart showing an example of a threshold setting routine executed by the HVECU of the example.

Next, a process for setting the threshold Peref used in the processing routine in FIG. 2 will be described. FIG. 3 is a flowchart showing an example of a threshold setting routine executed by the HVECU 70 of the example. The routine is repeatedly executed in parallel with the processing routine in FIG. 2.

When the threshold setting routine in FIG. 3 is executed, first, the HVECU 70 receives, as inputs, data such as PM accumulation amount Qpm and the filter temperature Tf (step S200). Here, as the PM accumulation amount Qpm, a value calculated (estimated) based on the pressure difference ΔP (ΔP=P1−P2) between the pressures P1, P2 from the pressure sensors 25a, 25b is input through communication from the engine ECU 24. As the filter temperature Tf, a value calculated (estimated) based on the operation state of the engine 22 is input through communication from the engine ECU 24.

When the data is input in this manner, the input PM accumulation amount Qpm is compared to the predetermined accumulation amount Qpmref (step S210). When the PM accumulation amount Qpm is equal to or more than the predetermined accumulation amount Qpmref, the filter temperature Tf is compared to the predetermined temperature Tfref (step S220). The processes in steps S210 and S220 are processes for determining whether or not the filter regeneration condition described above is established.

When the PM accumulation amount Qpm is less than the predetermined accumulation amount Qpmref in step S210, or when the PM accumulation amount Qpm is equal to or more than the predetermined accumulation amount Qpmref in step S210 and the filter temperature Tf is lower than the predetermined temperature Tfref in step S220, the HVECU 70 determines that the filter regeneration condition is not established, the threshold Peref is set to a predetermined value Pe1 (step S230), and the routine is ended. Here, the predetermined value Pe1 may be, for example, 8 kW, 10 kW, or 12 kW.

When the HVECU 70 determines that the PM accumulation amount Qpm is equal to or more than the predetermined accumulation amount Qpmref in step S210 and the filter temperature Tf is equal to or higher than the predetermined temperature Tfref in step S220, the HVECU 70 determines that the filter regeneration condition is established, the threshold Peref is set to a predetermined value Pe2 that is higher than the predetermined value Pe1 (step S240), and the routine is ended. Here, the predetermined value Pe2 may be, for example, a value higher than the predetermined value Pe1 by 3 kW, 5 kW, or 7 kW. As described above, when the filter regeneration condition is established, the threshold Peref is set to the value higher than that of when the filter regeneration condition is not established. Accordingly, while the filter regeneration condition is established and the injection of the fuel into the engine 22 is stopped, an increase in the needed power Pe* to the threshold Peref or higher can be suppressed, and restarting of the injection of the fuel into the engine 22 (operation) can be suppressed. As a result, regeneration of the PM filter 25 can be performed more sufficiently.

In the hybrid vehicle 20 of the example described above, regarding the restarting of the injection of the fuel into the engine 22 (operation) when the needed power Pe* reaches the threshold Peref or higher while the injection of the fuel into the engine 22 is stopped, when the filter regeneration condition is established, the threshold Peref is set to the value higher than that of when the filter regeneration condition is not established. Accordingly, while the filter regeneration condition is established and the injection of the fuel into the engine 22 is stopped, an increase in the needed power Pe* to the threshold Peref or higher can be suppressed, and restarting of the injection of the fuel into the engine 22 (operation) can be suppressed. As a result, regeneration of the PM filter 25 can be performed more sufficiently. Furthermore, while the filter regeneration condition is established and the injection of the fuel into the engine 22 is stopped, by motoring the engine 22 using the second motor MG1, a larger amount of air (oxygen) can be supplied to the PM filter 25. In addition, the time needed to complete the regeneration of the PM filter 25 can be shortened.

In the hybrid vehicle 20 of the example, while the injection of the fuel into the engine 22 is stopped, the engine 22 is motored by the second motor MG1 regardless of whether or not the filter regeneration condition is established. However, when the filter regeneration condition is established while the injection of the fuel into the engine 22 is stopped, the engine 22 may be motored by the second motor MG1. When the filter regeneration condition is not established, the engine 22 may not be motored by the second motor MG1. In addition, while the injection of the fuel into the engine 22 is stopped, regardless of whether or not the filter regeneration condition is established, the engine 22 may not be motored by the second motor MG1.

In the hybrid vehicle 20 of the example, regarding the restarting of the injection of the fuel into the engine 22 (operation) when the needed power Pe* reaches the threshold Peref or higher while the injection of the fuel into the engine 22 is stopped, when the filter regeneration condition is established, the threshold Peref is set to the value higher than that of when the filter regeneration condition is not established. However, regarding the restarting of the injection of the fuel into the engine 22 when the needed power Pd* reaches a threshold Pdref or higher while the injection of the fuel into the engine 22 is stopped, when the filter regeneration condition is established, the threshold Pdref may be set to a value higher than that of when the filter regeneration condition is not established. In addition, regarding the restarting of the injection of the fuel into the engine 22 when the needed torque Td* reaches a threshold Tdref or higher while the injection of the fuel into the engine 22 is stopped, when the filter regeneration condition is established, the threshold Tdref may be set to a value higher than that of when the filter regeneration condition is not established. Even in the cases, it is possible to achieve the same effects as those of the example.

In the hybrid vehicle 20 of the example, when acceleration is turned off during the operation of the engine 22, the injection of the fuel into the engine 22 is stopped. However, when the needed power Pe* reaches a threshold Peref2 or lower, which is sufficiently smaller than the threshold Peref (the predetermined value Pe1 or the predetermined value Pe2) during the operation of the engine 22, the injection of the fuel into the engine 22 may be stopped. Furthermore, when the needed power Pd* is smaller than the input limit Win (<0) of the battery 50 (larger as the absolute value), that is, when the needed power Pd* cannot be covered by the regenerative drive of the motor MG2 for traveling, the injection of the fuel into the engine 22 may be stopped.

In the hybrid vehicle 20 of the example, the battery 50 is used as the power storage device, but a capacitor may also be used.

In the hybrid vehicle 20 of the example, the engine ECU 24, the motor ECU 40, the battery ECU 52, and the HVECU 70 are provided. However, at least two of the components may be configured as a single electronic control unit.

Figure 4:
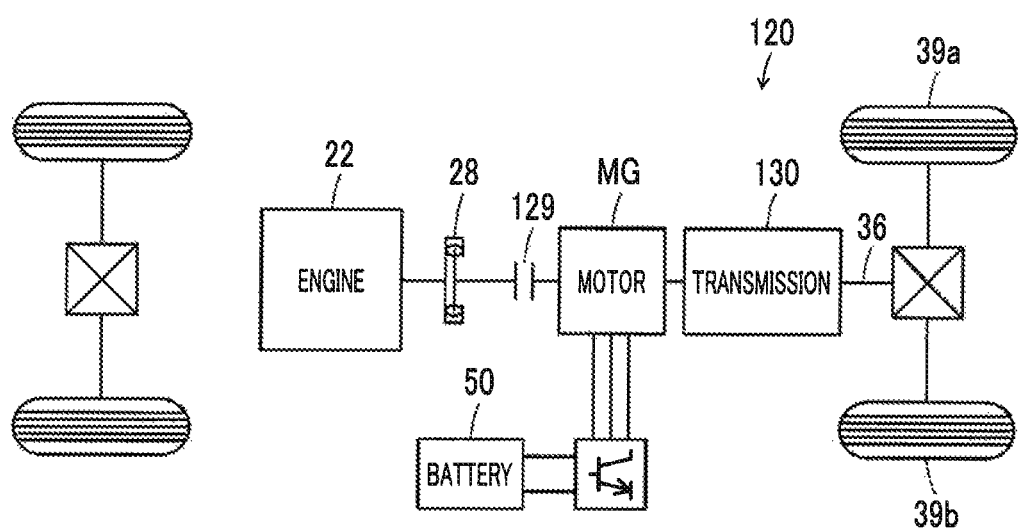
FIG. 4 is a configuration diagram schematically illustrating the configuration of a hybrid vehicle of a modification example.

In the example, the embodiment is applied to the hybrid vehicle 20 in which the second motor MG1 is connected to the sun gear of the planetary gear 30, the engine 22 is connected to the carrier via the damper 28, and the driving shaft 36 connected to the driving wheels 39a, 39b and the motor MG2 for traveling are connected to the ring gear. However, the embodiment may also be applied to a hybrid vehicle having any configuration as long as the hybrid vehicle is provided with an engine for traveling in which a filter that removes particulate matter is attached to an exhaust system, and a motor for traveling. For example, as illustrated in a hybrid vehicle 120 of a modification example of FIG. 4, the embodiment may also be applied to the hybrid vehicle 120 in which a motor MG is connected to a driving shaft 36 connected to driving wheels 39a, 39b via a transmission 130, and an engine 22 is connected to the motor MG via a clutch 129.

The correspondence between the main elements of the example and the main elements described in "SUMMARY" will be described. In the example, the engine 22 corresponds to "engine", the motor MG1 corresponds to "second motor", the planetary gear 30 corresponds to "planetary gear", the motor MG2 corresponds to "motor for traveling", the battery 50 corresponds to "power storage device", and the HVECU 70, the engine ECU 24, the motor ECU 40, and the battery ECU 52 correspond to "electronic control unit".

The correspondence between the main elements of the example and the main elements described in "SUMMARY" is an example for specifically describing the embodiments described in "SUMMARY" by the example, and does not limit the elements described in "SUMMARY". That is, the interpretation of the aspects described in "SUMMARY" should be made based on the description in "SUMMARY", and the example is merely a specific example of the aspects described in "SUMMARY".

Although the embodiments have been described above using the examples, the disclosure is not limited to the examples, and various modifications may be made without departing from the gist of the disclosure.

The embodiment is applicable to the manufacturing industry of hybrid vehicles and the like.

What is claimed is:

1. A hybrid vehicle comprising:
   an engine having an exhaust system in which a filter that removes particulate matter is provided;
   a first motor configured to generate a driving force for the hybrid vehicle; and
   an electronic control unit configured to restart injection of a fuel into the engine when a needed output of the engine reaches a threshold or higher while the injection of the fuel into the engine is stopped,
   wherein the electronic control unit is configured to, when a filter regeneration condition that an accumulation amount of the particulate matter on the filter is equal to or more than a predetermined accumulation amount and a temperature of the filter is equal to or higher than a predetermined temperature is established, set the threshold to be higher than a threshold set when the filter regeneration condition is not established.

2. The hybrid vehicle according to claim 1, further comprising:
   a second motor; and
   a planetary gear having three rotating elements, each of which is connected to a driving shaft connected to a driving wheel, an output shaft of the engine, and a rotating shaft of the second motor respectively,
   wherein:
   the first motor is connected to the driving shaft; and
   the electronic control unit is configured to, while the filter regeneration condition is established and the injection of the fuel into the engine is stopped, control the second motor such that the engine is motored by the second motor.

* * * * *